United States Patent
Lioy et al.

(10) Patent No.: US 9,069,554 B2
(45) Date of Patent: Jun. 30, 2015

(54) SYSTEMS AND METHODS TO COORDINATE RESOURCE USAGE IN TIGHTLY SANDBOXED ENVIRONMENTS

(71) Applicants: Marcello V. Lioy, Mercer Island, WA (US); Jack H. Profit, Vashon, WA (US)

(72) Inventors: Marcello V. Lioy, Mercer Island, WA (US); Jack H. Profit, Vashon, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 249 days.

(21) Appl. No.: 13/625,724

(22) Filed: Sep. 24, 2012

(65) Prior Publication Data

US 2014/0089933 A1    Mar. 27, 2014

(51) Int. Cl.
*G06F 9/46*    (2006.01)
*G06F 1/32*    (2006.01)
*G06F 9/48*    (2006.01)

(52) U.S. Cl.
CPC .............. *G06F 1/329* (2013.01); *G06F 9/4893* (2013.01); *Y02B 60/144* (2013.01)

(58) Field of Classification Search
None
See application file for complete search history.

(56) References Cited

U.S. PATENT DOCUMENTS

2007/0136579 A1* 6/2007 Levy et al. .................... 713/168
2009/0183157 A1* 7/2009 Tran et al. ..................... 718/100

OTHER PUBLICATIONS

International Search Report and Written Opinion—PCT/US2013/061502—ISA/EPO—Jan. 3, 2014.

* cited by examiner

*Primary Examiner* — Sisley Kim
(74) *Attorney, Agent, or Firm* — Neugeboren O'Dowd PC (57) ABSTRACT

Systems and methods are disclosed for coordinating resource usage between applications in a tightly sandbox environment. A scheduling indicator can be left in a system file that multiple applications can use to align their requests for a system resource. Alternatively, IP loopback can be used to pass a scheduling indicator between applications that are otherwise sandboxed. If either of these approaches is not possible, then applications can schedule system resource requests using a common algorithm that selects a start time and optionally a period of subsequent system resource requests based on a common piece of information such as a system clock signal or IP address. In these ways the total amount of time during which the system resource is being utilized by various applications can be reduced, thus reducing power consumption, and network activity.

22 Claims, 5 Drawing Sheets

SYSTEMS AND METHODS TO COORDINATE RESOURCE USAGE IN TIGHTLY SANDBOXED ENVIRONMENTS

BACKGROUND

1. Field

The presently disclosed embodiments relate generally to power conservation in a computing device, and more specifically to coordination of processes within a computing device.

2. Background

Some operating systems isolate (or sandbox) applications from each other to improve security and system stability. Sandboxing precludes applications from directly communicating with each other or being coordinated via a background service such as a daemon. Sandboxing can also preclude IP loopback communications, wherein two consenting applications use a loopback interface to communicate. Other forms of sandboxing can further preclude access to common system files. MICROSOFT'S WINDOWS 8 operating system, operating in METRO mode, is one example of an operating system that carries out some of the above forms of sandboxing.

Yet, coordination between applications can be a key to certain power saving methods. For instance, when various applications use a modem at different times, the modem may remain active for long periods despite only being in use for short bursts of time. Coordination between the applications can activate the modem for shorter periods of time, and less often, thus conserving device power. For example, if several applications use the radio to advertise their presence (e.g., peer-to-peer applications looking for peers on other devices), it could be beneficial for these applications to send discovery messages at substantially the same time. In this fashion, the radio need only be activated when the messages are jointly sent, and can remain off until the discovery messages need to be sent again. Without such coordination, each application would utilize the radio to transmit according to its own schedule resulting in frequent activations of the radio. In a worst case scenario the radio would not have a chance to power down or idle.

Other instances of application coordination can also reduce power or achieve other functionality. Coordination can make logic processes simpler to carry out. In an example, multiple applications may attempt to control an LED of a mobile device. Determining which application gets priority in this control is simplified if the requests for the LED arrive at substantially the same time. Thus, coordination of the requests can simplify the logic decision. This is just one of many instances where coordination of processes is beneficial for logic decisions.

There is therefore a need in the art for coordination of application processes on systems where sandboxing is implemented.

SUMMARY

Embodiments disclosed herein address the above stated needs by enabling coordination of system resource requests from multiple applications despite various forms of sandboxing. Systems and methods are disclosed for coordinating resource usage between applications in a tightly sandbox environment. A scheduling indicator can be left in a system file that multiple applications can use to align their requests for a system resource. Alternatively, IP loopback can be used to pass a scheduling indicator between applications that are otherwise sandboxed. If either of these approaches is not possible, then applications can schedule system resource requests using a common algorithm that selects a start time and optionally a period of subsequent system resource requests based on a common piece of information such as a system clock signal or IP address. In these ways the total amount of time during which the system resource is being utilized by various applications can be reduced, thus reducing power consumption, and network activity.

One aspect of the disclosure can be characterized as a method comprising, reading, by a second application, a scheduling indicator written to a publicly-accessible file by a first application, wherein the scheduling indicator indicates a schedule of one or more requests for a system resource by the first application. The method can further include scheduling a request for the system resource by the second application, the request for the system resource by the second application being time-aligned with at least one of the one or more requests for the system resource by the first application. The method can also include executing the request for the system resource by the second application.

Another aspect of the disclosure can be characterized as a system having a first application, a memory, a second application, and a scheduling module. The memory can store a first schedule of one or more requests for a system resource by the first application. The scheduling module of the second application can read the first schedule from the memory and schedule a request for the system resource by the second application. The request for the system resource by the second application can be scheduled according to a second schedule based on the first schedule such that the request for the system resource by the second application is substantially time-aligned with at least one of the one or more requests for the system resource by the first application. Finally, the scheduling module of the second application can record the second schedule to the memory.

Yet another aspect of the disclosure is an apparatus having a publicly-accessible file, a first application, and a second application. The first application can make one or more requests for a system resource, determine if the publicly-accessible file exists, and if not, then create the publicly-accessible file. The first application can further modify the publicly-accessible file to include data usable by one or more other applications to coordinate timing of their requests for the system resource with at least one of the one or more requests for the system resource made by the first application. The second application can read the publicly-accessible file and coordinate timing of a request for the system resource made by the second application with the timing of at least one of the one or more requests for the system resource made by the first application. The apparatus can also preclude direct communication between the first and second applications.

Yet a further aspect of the disclosure can be characterized as a non-transitory, tangible computer readable storage medium, encoded with processor readable instructions to perform a method for coordinating requests for system resources of a plurality of applications running in an operating system that sandboxes applications from communication with each other. The method can include accessing a common piece of information. The method can further include scheduling requests for the system resource by the first and second applications, where at least one request of the system resource by the first application is substantially time-aligned with at least one request for the system resource by the second application, the scheduling being derived via algorithm from the common piece of information. The method can also include executing the requests of the system resource by the first and second applications.

Another aspect of the disclosure can be characterized as a system comprising various means. The system can include a means for accessing a common piece of information. The system can also include a means for deriving a schedule of application requests for a system resource, the requests being made by two or more applications sandboxed from each other on the system. The schedule can be derived from the common piece of information. Also, the system can include a means for performing the requests for the system resource according to the schedule.

Yet another aspect of the disclosure can be characterized as a method for reducing computing resource consumption in a user device that precludes direct communication between applications running on the user device. The method can include scheduling one or more requests for the system resource by the first application. The method can further include passing a scheduling indicator from a first application to a second application via a loopback interface of the user device. The method can also include determining a schedule of the one or more requests for the system resource by the first application from the scheduling indicator. The method can yet further include scheduling a request for the system resource by the second application. The request for the system resource by the second application can be substantially time-aligned with at least one of the one or more requests for the system resource by the first application. Finally, the method can include executing the request for the system resource by the second application.

DETAILED DESCRIPTION

The word "exemplary" is used herein to mean "serving as an example, instance, or illustration." Any embodiment described herein as "exemplary" is not necessarily to be construed as preferred or advantageous over other embodiments.

As noted above, when multiple applications vie for the same system resource (CPU, GPU, memory, network interface, browser engine, to name a few) inefficient utilization of that system resource may result. Therefore there is a need for coordination between applications. At the same time there may be certain applications whose inherent functionality depends upon coordination between applications. Yet, many operating systems prevent direct communication between applications and thus coordination is not possible via existing methods. This disclosure describes systems and methods for enabling coordination between applications in a tightly sandbox environment—where applications are prevented from directly communicating with each other.

Figure 1:
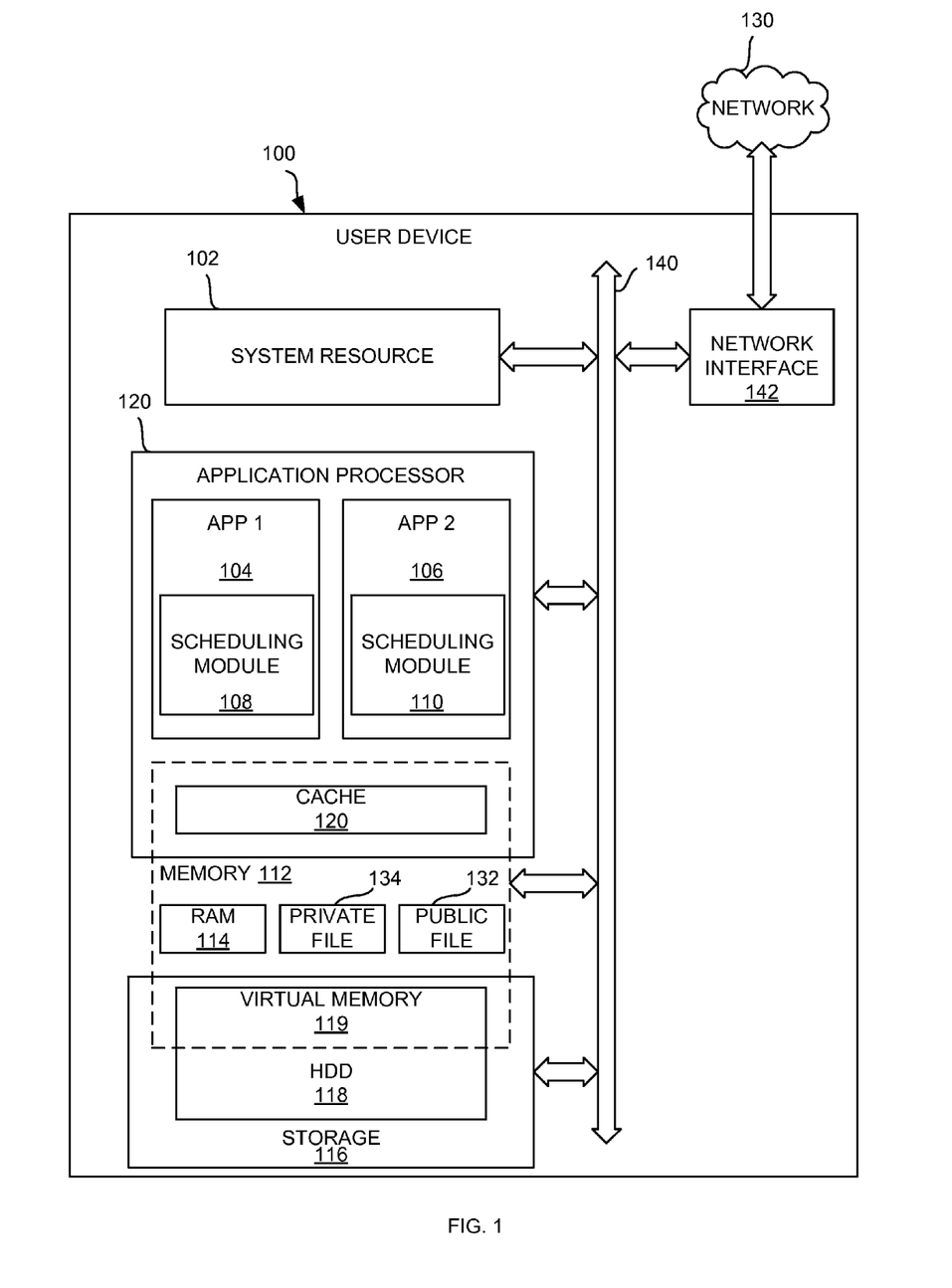
FIG. 1 illustrates a user device 100 having a system resource 102 and applications 104 and 106 both making requests for the system resource 102.
Figure 2:
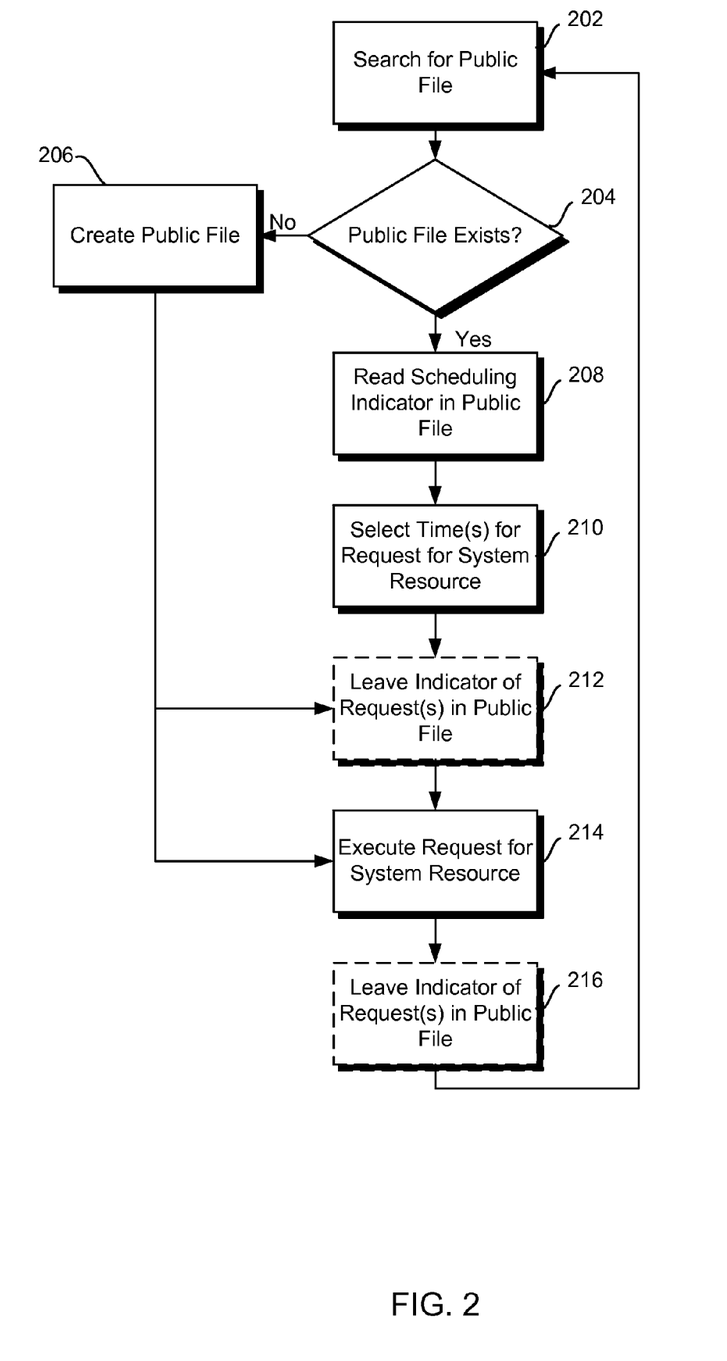
FIG. 2 illustrates a method 200 for coordinating usage of system resources by two or more applications sandboxed so as to be unable to communicate with each other or to receive communications from other applications such as a coordinating daemon.

In one embodiment, applications can schedule system resource requests based on a scheduling indicator stored in a system file accessible to all or most applications on the device (see FIGS. 1 and 2). This embodiment is advantageous since the scheduling indicator can include complex and sophisticated information to aid in scheduling. However, many operating systems have begun to preclude public access to system files, and thus this method is not always usable. Another embodiment, that enables coordination when there is not public access to system files, is to distribute a scheduling indicator to applications via the IP loopback protocol and a loopback interface. This approach also allows complex and sophisticated scheduling information to be circulated, but again suffers from the fact that some operating systems are precluding IP loopback as part of their sandboxing protocols. If neither of the first two approaches can be used, then, applications can schedule system resource requests based on a common piece of information such as an IP address of the device or a system clock signal (see FIGS. 3 and 4).

FIG. 1 illustrates a user device 100 having a system resource 102 and applications 104 and 106 both making requests for the system resource 102. If not aligned, these requests could conflict or at least cause inefficient utilization of the system resource 102. The system resource 102 can include any one or more of the application processor 120, the memory 112, or the network interface 142. The first application 104 can include a scheduling module 108 configured to leave a scheduling indicator in a public file 132 that a scheduling module 110 of the second application 106 can read to determine a schedule that the first application 104 intends to follow in making requests for the system resource 102. The scheduling module 110 of the second application 106 can determine a schedule for the second application 106 to make requests for the system resource 102 so as to time-align with the requests of the first application 104. In this way the scheduling modules 108, 110 help to coordinate system resource 102 requests by the two applications 104, 106, which otherwise cannot coordinate with each other via direct communication or via a daemon or other background service providing coordination instructions. Time-alignment of the requests enables the system resource 102 to decrease an amount of time that it remains in an active state, thus reducing power consumption and improving the user experience since the system resource 102 has more available time to attend to other requests and application needs.

In some embodiments, an operating system (OS) (not illustrated) can approve of or implement the schedule of the second application 106. The OS may have certain guidelines that require modification to the schedule. For instance, the OS may not allow requests for system resources 102 to made at exactly the same moment. The OS may therefore take the schedule and shift the times in which the second application 106 makes requests for the system resource 102 back by an amount of time, such that requests of the first and second applications 104, 106 occur sequentially.

The user device 100 may include an application processor 120 on which the first and second applications 104, 106 run on. The application processor 120 can include a cache 120, which can be a single memory component or a distributed system of memory components. For instance, each core of a multi-core application processor 120 can include its own cache component.

The user device 100 may include a memory 112 that can include random access memory (RAM) 114 and optionally the cache 120 and optionally a portion of a hard drive (HDD) 118 that is being used as virtual memory 119. The HDD 118 can be a part of a storage 116. The memory 112 can store private files 134 and public files 132, where private files are only available to the system or a limited group of applications. The public file 132 is accessible by most if not all applications including the first and second applications 104, 106. This means the first and second applications 104, 106 can read the public file and in some embodiments they can also write to it.

The user device 100 can further include a network interface 142 that enables communication between the user device 100 and a network 130 such as the Internet. The system resource 102, the network interface 142, the application processor 120, the memory 112, and the storage 116 are all interconnected and in communication with each other via a bus 140.

The system resource 102 can include any resource that has the potential to power down or enter some sort of dormant state. In particular, the system resource 102 can include a processing resource, a network resource, or a memory resource. For instance, a processing resource can be a CPU, application processor 120, baseband processor, or GPU to name a few. The network resource can be the network interface 142 or a network connection, to name two non-limiting examples. The memory resource can be the memory 112 including any one or more of the cache 120, the RAM 114, and/or the virtual memory 119. Although the application processor 120, the memory 112, and the network interface 142 are illustrated as being separate from the system resource 102, it should be understood that this is merely to simplify the visualization of the user device 100, and that in practice the system resource 102 can include any one or more of these system resources.

The scheduling module 110 of the second application 106 can search for the public file 132, and if it is not found, then it can create the public file 132. If the public file 132 does exist, then the scheduling module 110 can read the scheduling indicator in the public file 132. The scheduling indicator can include a schedule of requests for the system resource 102 made by or expected to be made by the first application 104. The scheduling indicator may also include designations of time slots that the first application 104 has reserved for making requests for the system resource 102. The scheduling indicator may alternatively be a time at which the first application 104 made a request for the system resource 102 along with an expected period between subsequent requests. The time can be periodically updated to simplify the calculation that the scheduling module 110 of the second application 106 performs in order to determine how to time-align system resource 102 requests with those made by the first application 104.

Upon reading the scheduling indicator, the scheduling module 110 can calculate or determine a schedule for the second application 106 to make requests for the system resource 102 so as to time-align with the requests that will be made by the first application 104. Time-alignment can include two or more requests occurring concurrently, substantially at the same time, or at different times. If occurring at different times, the two or more requests can occur sequentially—with as little lag between requests as possible. In some cases, requests can even overlap although not begin at the same instant. Whatever time the requests occur at, they may also share a common period. In some cases this includes each request having the same period, while in others two or more requests may occur with different periods, so time-aligned means that they are aligned according to a least common multiple of the various periods. In other embodiments, the scheduling module 110 may select non-concurrent and non-consecutive time slots in the schedule, where there is a specific reason for selecting such time slots.

Where the scheduling module 110 selects concurrent time slots to those to be used by the first application 104, the second application 106 can make requests according to its schedule without doing anything further. However, when consecutive time slots are selected, the scheduling module 110 may leave a scheduling indicator in the public file 132 letting other applications know which time slots have been (or will be) used by the second application 106. This may involve modifying the existing scheduling indicator or adding a new scheduling indicator to the public file 132.

The scheduling module 110 selects a schedule for the second application 106 wherein at least some requests are time-aligned with some requests of the first application 104. In one instance, the second application 106 may immediately make a system resource 102 request regardless of alignment and then time-align the second system resource 102 request. In another instance, the second application 106 may delay its first system resource 102 request in order to time-align with the requests from the first application 104. Which option is used depends on the requirements of the second application 106. For instance, where an immediate delay in requesting the system resource 102 is not tolerable, the request may be immediately made with delay occurring on the second cycle so that all further requests are time-aligned with those of the first application 102. In one embodiment, a logical decision may be made to determine whether to delay the first system resource 102 request from the second application 106 or whether to make the request immediately and delay the second request. This determination may be made based on a threshold tolerance for the delay—if the required delay exceeds the threshold, then the second application 106 may make its first request without delay and without alignment, while delaying the second request in order to achieve alignment; if the required delay is below the threshold, then the second application 106 can delay its first system resource 102 request so that time-alignment is achieved with the first cycle.

The embodiments of the user device 100 have so far been described in terms of a first and second application 104, 106. However, one of skill in the art will recognize that the operations of the second application 106 can also apply to a plurality of other applications such that a plurality of applications make concurrent or consecutive system resource 102 requests (time-aligned requests). These embodiments also apply where new applications come online and time-align with a plurality of other applications that are already coordinated, and also applies where one or more coordinated applications pull out of the coordination and either run in a non-coordinated fashion or go offline.

One of skill in the art will further understand that while only a single private file 134 is illustrated, in practice a plurality of private files 134 are likely to be encountered. Additionally, while components are illustrated as having direct communication with the bus 140, in some embodiments there may be interfacing components between a given component and the bus 140. For instance, a memory controller could act as an interface between the memory 112 and the bus 140.

The RAM 114 can represent one or more hardware components. The HDD 118 can take a variety of forms such as a disc drive with magnetically stored bits or as a flash-based drive having bits stored via switches such as the charge on a transistor, to name just two examples.

FIG. 2 illustrates a method 200 for coordinating usage of system resources by two or more applications sandboxed so as to be unable to communicate with each other or to receive communications from other applications such as a coordinating daemon. The method 200 begins with a first application (e.g., first application 104) searching for a public file 202

(e.g., public file 132) in a memory (e.g., memory 112). Where there is no public file 204, the public file can be created 206. The first application can execute a request for a system resource 214 (e.g., system resource 102), and then optionally leave a scheduling indicator in the public file 216. Alternatively, the first application can first leave a scheduling indicator in the public file 210 and then execute the request 214. The scheduling indicator can be used by other applications to coordinate their requests for the system resource with requests made by the first application.

The method 200 can then repeat for a second application (e.g., second application 106). The second application may initially search for a public file 202, and upon finding the public file 204, the second application can read the scheduling indicator 208 stored by the first application. Based on the scheduling indicator the second application can select one or more times or timeslots for making a request for the system resource. The one or more times can be selected to time-align with the times when the first application will be making the same request. Alignment of the requests means that the system resource is more efficiently used than it would be with the first and second applications making non-aligned requests for the system resource.

After selecting one or more times, the second application can execute the one or more requests at the selected one or more times 214. Optionally, the second application can leave a scheduling indicator in the public file before 212 or after 216 the execution of the request 214, where the scheduling indicator enables further applications to coordinate their requests for the system resource with the requests of the first and second applications. For the second application, the optional leave a scheduling indicator operations 212, 216 may be most useful where the first and second applications are time-aligned in a sequential rather than concurrent fashion. This is because, if the first and second applications make requests at the same times, then the scheduling indicator written to memory by the first application should be sufficient to enable further applications to also execute requests concurrently with the first and second applications. However, where the first and second applications execute requests consecutively, then both the first and second applications should leave a scheduling indicator, or the second application should update the scheduling indicator, so that further applications can schedule their requests in time slots other than those already selected for the first and second applications.

Although the create public file operation 206 is illustrated as taking place before the execute request for hardware resource operation 214, in some embodiments the create public file operation 206 can occur after the execute operation 214.

In an alternative, applications can unwittingly coordinate by accessing a common piece of information (Block 402 in FIG. 4) and using it to determine the starting time for requests and by each application having code that requests the system resource with the same periodicity. A common piece of information could include an IP address, for instance. Each application can include an algorithm that determines a start time and optionally a period based on the common piece of information (Blocks 404 and 406). For instance, where the common piece of information is an IP address, the algorithm can derive a start time and optionally a period as derived from the IP address. In some embodiments, all applications from a given library can be programmed to have a certain start time and period as derived from the common piece of information. Here, applications using different libraries may generate non-aligned system requests, but at least all those applications using a given library can be coordinated. Once the schedule of requests has been derived, the requests for the system resource can be executed per the schedule (Block 408).

In another alternative embodiment, applications can coordinate using a system broadcast that the user device 100 would typically produce regardless of the herein disclosed systems and methods. For instance, a system clock signal is one example of a system broadcast. In other words, the scheduling modules 108, 110 can be configured to monitor for system broadcasts and use the broadcast time as a reference point to set a schedule of requests for the system resource 102. Each scheduling module 108, 110 is configured to use the same period, but to use system broadcasts as the starting time or at least a reference for a start time. For instance, an offset from the system broadcast can be included such that the first and second applications 104, 106 execute the requests at the same start time delayed from the system broadcast. In some embodiments, the system broadcast can be periodic.

Although sandboxed applications cannot directly coordinate with each other, applications may all have access to a common piece of information, such as information provided in a system broadcast. For instance, all applications may have access to a clock signal broadcast throughout the system, or to an IP address of the device.

Alternatively, a daemon or coordinating application can pass coordinating information, such as a schedule or start time and period, to other applications via the IP loopback feature of most devices. In this embodiment, a first application transmits scheduling indicator to a willing recipient application through the network interface of the user device. For instance, data packets can be routed to an IP address that is internal to the device, such that data packets pass to the network interface and are then routed back into the device to the recipient application.

It should be understood that the order of method steps in FIG. 2 is exemplary only, and in alternative embodiments the method steps can be interchanged without departing from the scope of the invention.

Figure 3:
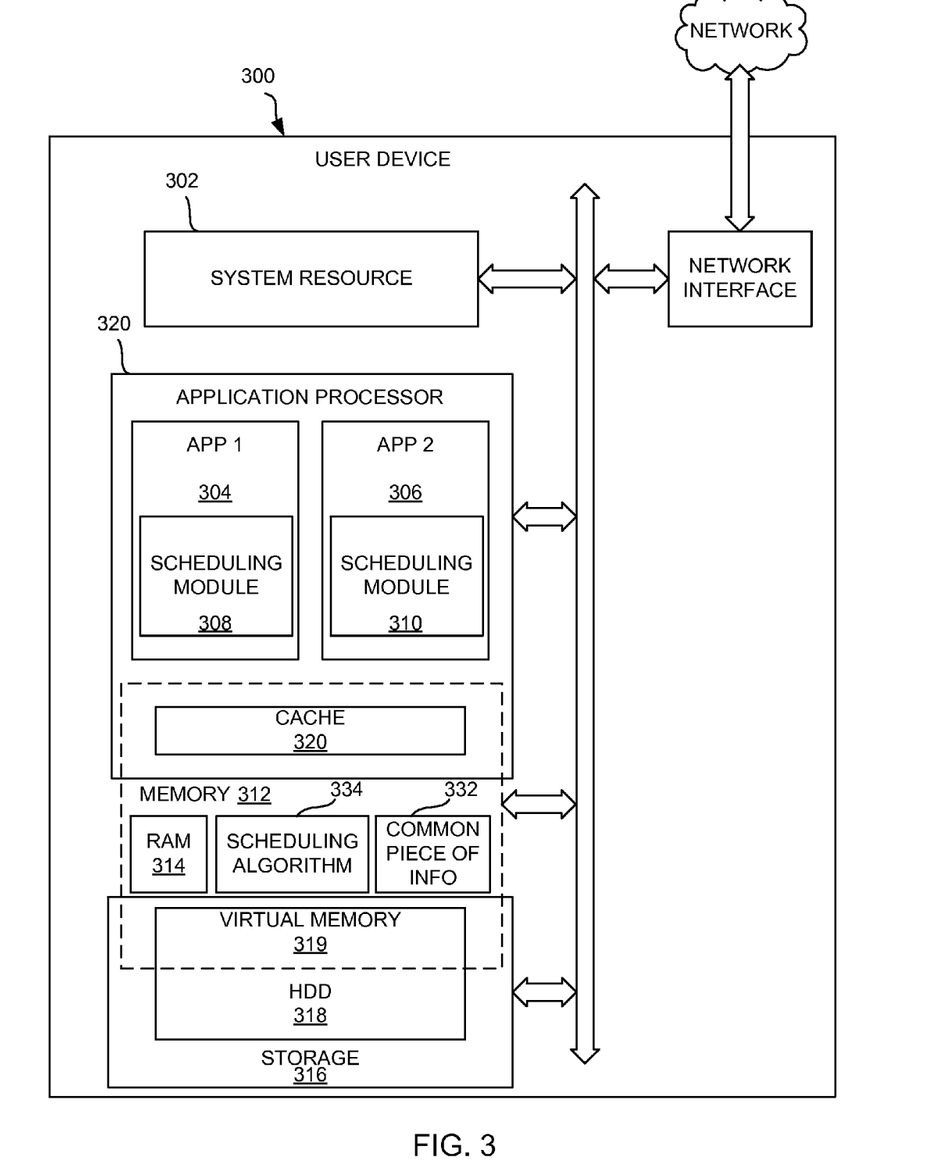
FIG. 3 illustrates a user device for scheduling aligned application requests for a system resource.

FIG. 3 illustrates a user device for scheduling aligned application requests for a system resource. The following description will include parenthetical references to the method illustrated in FIG. 4. The user device 300 can include a first application 304 and a second application 306 both attempting to access the same system resource 302. In this embodiment, both applications 304, 306 may have access to a common piece of information 332, such as an IP address of the user device 300 or a clock signal, to name two non-limiting examples. Upon accessing the common piece of information 332 (Block 402), scheduling modules 308, 310 in each of the first and second applications 304, 306 can run a scheduling algorithm 334 (Block 404) to select times (or alternatively to derive a schedule) for the requests of the system resource 302 (Block 406), where the algorithm derives the times based on the common piece of information. For instance, the scheduling algorithm 334 may parse an IP address of the user device 300 and convert the parsed IP address into a time and period, where the time is a first time that each of the first and second applications 304, 306 are to access the system resource 302, and the period is a period with which the first and second applications 304, 306 are to access the system resource 302 thereafter. Once the schedule is determined, the application processor 320 may execute the time-aligned requests for the system resource 302 (Block 408) made by the first and second applications 304, 306 according to the schedule.

The common piece of information 332 and the scheduling algorithm 334 can be stored in a memory 312, which can reside in at least a part of one or more of the following: a cache 320, RAM 314, or virtual memory 319. The virtual memory 319 can be a segment of a hard drive (HDD) 318 that is set aside for memory 312 usage when more preferred memory (e.g., RAM 314) is filled. The HDD 318 can be a part of a storage 316.

In some instances, the common piece of information 332 can be stored as part of the BIOS, and can therefore be stored in a type of storage that is not illustrated. For instance, the BIOS is sometimes stored on a memory 312 that is separate from the cache 320, RAM 314, or virtual memory 319. In some cases, the common piece of information 332 can be stored in a ROM residing on the application processor 320 or accessible by the application processor 320. In other instances, the common piece of information 332 does not reside in memory but is a signal propagating through the user device 300, such as a system clock signal.

In some instances, the scheduling algorithm 334 can be a part of the scheduling modules 308, 310. In other instances, the scheduling algorithm 334 can be part of an API used to develop the applications 304, 306. In one embodiment, access to the common piece of information 332 means that the applications 304, 306 can read the common piece of information 332.

Figure 4:
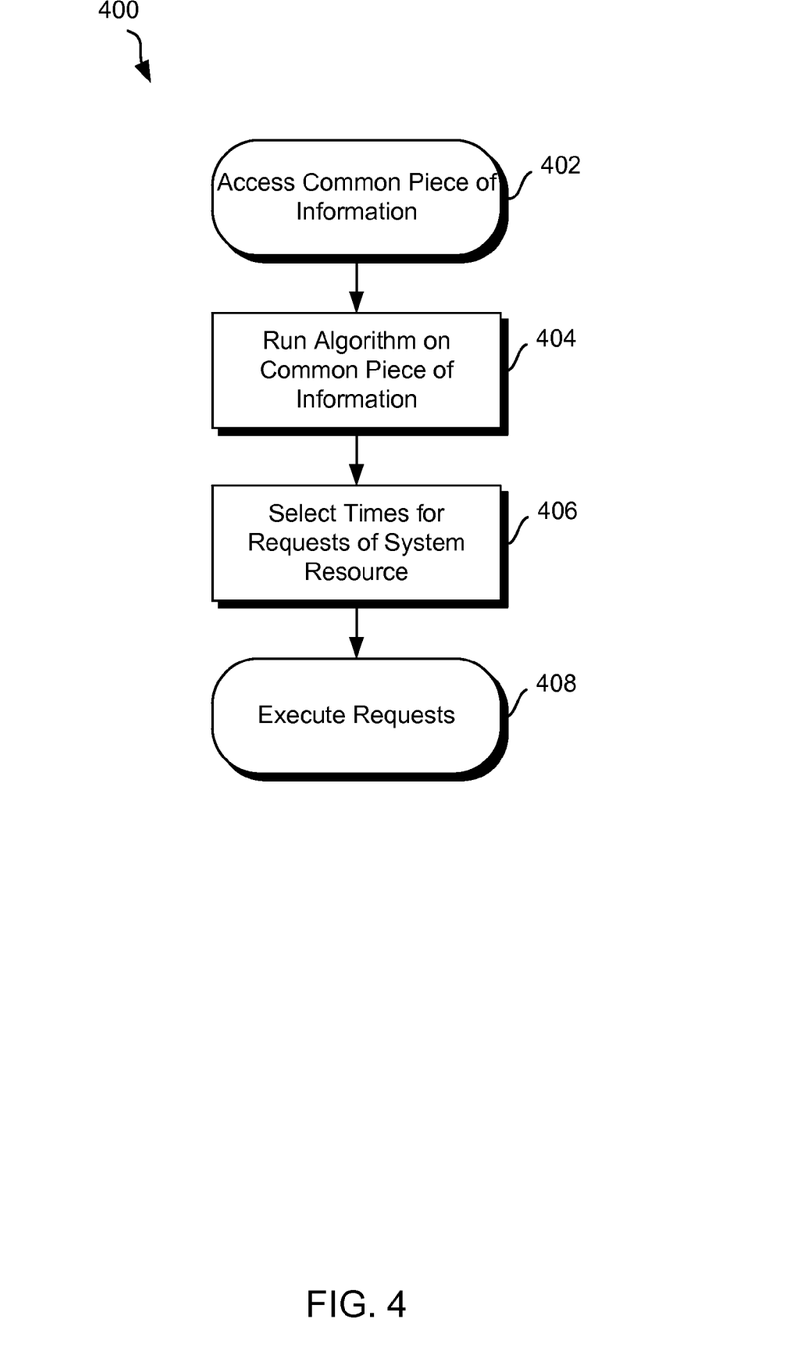
FIG. 4 illustrates a method for scheduling aligned application requests for a system resource.

FIG. 4 illustrates a method for scheduling aligned application requests for a system resource. The method 400 can include accessing a common piece of information in accessing operation 402. Two or more applications can then run a scheduling algorithm in run scheduling algorithm operation 404. The algorithm can select times and optionally a period (or alternatively derive a schedule) for the requests of the system resource in selection operation 406. Once the times and optionally a period are selected, or the schedule is determined, the time-aligned requests can be executed in execute operation 408.

Figure 5:
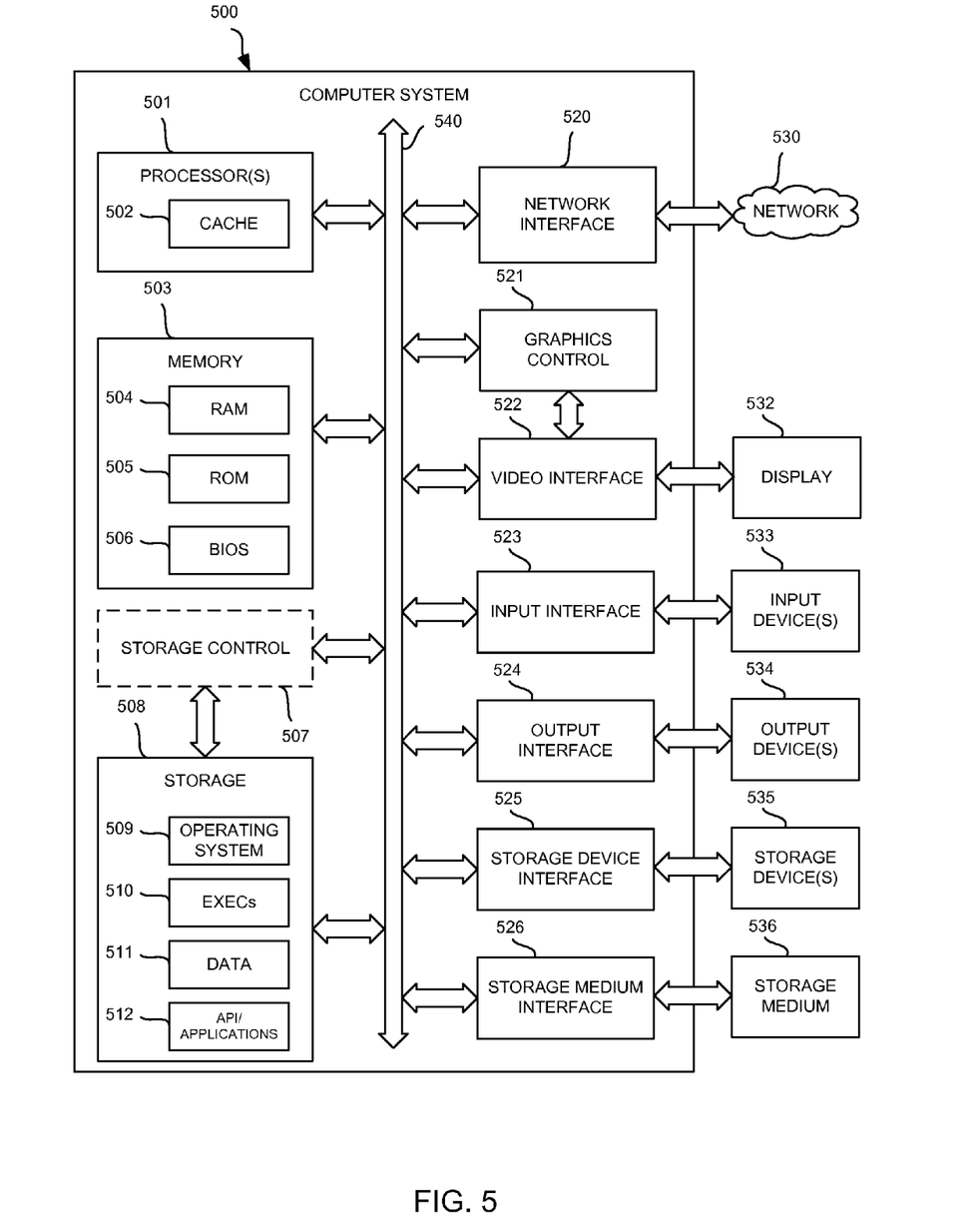
FIG. 5 shows a diagrammatic representation of one embodiment of a machine in the exemplary form of a computer system.

The systems and methods described herein can be implemented in a machine such as a computer system in addition to the specific physical devices described herein. FIG. 5 shows a diagrammatic representation of one embodiment of a machine in the exemplary form of a computer system 500 within which a set of instructions can execute for causing a device to perform or execute any one or more of the aspects and/or methodologies of the present disclosure. The components in FIG. 5 are examples only and do not limit the scope of use or functionality of any hardware, software, embedded logic component, or a combination of two or more such components implementing particular embodiments.

Computer system 500 may include a processor 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer readable instructions. Computer system 500 may provide functionality as a result of the processor(s) 501 executing software embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, EXECs 510 (executables), data 511, API applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X)

bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    searching to determine whether a publicly-accessible file in a memory exists;
    creating the publicly-accessible file if the publicly-accessible file does not exist;
    reading, by a second application, a scheduling indicator written to the publicly-accessible file by a first application if the publicly-accessible file exists, wherein the scheduling indicator indicates a schedule of one or more requests for a system resource by the first application, designations of time slots that the first application has reserved for making the one or more requests for the system resource, and an expected period between subsequent requests;
    scheduling a request for the system resource by the second application, the request for the system resource by the second application being time-aligned with at least one of the one or more requests for the system resource by the first application; and
    executing the request for the system resource by the second application;
    wherein the first and second applications execute their corresponding requests consecutively, and then the first and second applications update the scheduling indicator,
    wherein the first and second applications are sandboxed to prevent communication between the first and second applications and any other applications or services.

2. The method of claim 1, wherein the request for the system resource by the second application is time-aligned with a first of the one or more requests for the system resource by the first application.

3. The method of claim 1, wherein the request for the system resource by the second application is time-aligned with a second of the one or more requests for the system resource by the first application.

4. The method of claim 3, wherein a second request for the system resource by the second application is time-aligned with a third of the one or more requests for the system resource by the first application.

5. The method of claim 1, wherein the request for the system resource by the second application is time-aligned with a third request for the system resource by the first application.

6. The method of claim 1, wherein time-aligned includes occurring concurrently.

7. The method of claim 1, wherein time-aligned includes occurring substantially at the same time.

8. The method of claim 1, wherein time-aligned includes occurring at different times.

9. The method of claim 8, wherein time-aligned includes occurring with a common periodicity.

10. The method of claim 9, wherein the common periodicity is a least common multiple of a periodicity of each of two or more requests for the system resource.

11. The method of claim 8, wherein time-aligned includes occurring sequentially.

12. The method of claim 1, wherein time-aligned includes occurring with a common periodicity.

13. The method of claim 1, wherein the scheduling indicator is a modification of an existing scheduling indicator.

14. The method of claim 1, wherein the scheduling indicator is new information written to the publicly-accessible file.

15. The method of claim 1, further comprising writing another scheduling indicator to the publicly-accessible file, wherein the another scheduling indicator indicates a schedule of the request for the system resource by the second application.

16. A system comprising:
    a first application scheduled to make one or more requests for a system resource;
    a memory that stores a scheduling indicator that indicates a first schedule of the one or more requests for the system resource by the first application, designations of time slots that the first application has reserved for making the one or more requests for the system resource, and a time at which the first application made the one or more request for the system resource;
    a second application; and
    a scheduling module on the second application, that:
        searches to determine whether the first schedule exists in the memory;
        creates the first schedule if the first schedule does not exist in the memory;
        reads the scheduling indicator from the memory;
        schedules a request for the system resource by the second application according to a second schedule based on the scheduling indicator such that the request for the system resource by the second application is time-aligned with at least one of the one or more requests for the system resource by the first application; and
        records the second schedule to the memory;
        wherein first and second applications execute their corresponding requests consecutively, and then the first and second applications update the scheduling indicator,
    wherein the first and second applications are sandboxed to prevent communication between the first and second applications and any other applications or services on the system.

17. The system of claim 16, further comprising a scheduling module of a third application, that:
    reads the scheduling indicator from the memory;
    schedules a request of the system resource by the third application according to a third schedule based on at least the scheduling indicator such that the request of the system resource by the third application is time-aligned with at least one of the one or more requests for the system resource by the first application;
    records the third schedule to the memory.

18. The system of claim 17, wherein the scheduling module of the third application further:
    reads the scheduling indicator from the memory;
    schedules a request of the system resource by the third application according to a third schedule based on the scheduling indicator such that the request of the system resource by the third application is time-aligned with at least one of the one or more requests for the system resource by the first application and the request for the system resource by the second application;
    records the third schedule to the memory.

19. The system of claim 16, wherein the request for the system resource by the second application is scheduled in an unused timeslot of the first schedule.

20. The system of claim 16, wherein the system resource is selected from the group consisting of: a processing resource, a memory resource, and a network resource.

21. The system of claim 16, wherein the first schedule is publicly accessible.

22. The system of claim 21, wherein the first schedule is a system file.

* * * * *